United States Patent [19]

Etter

[11] Patent Number: 4,895,753

[45] Date of Patent: Jan. 23, 1990

[54] FENDER COVER

[75] Inventor: Thomas J. Etter, St. Paul, Minn.

[73] Assignee: Minnesota Mining and Manufacturing Company, St. Paul, Minn.

[21] Appl. No.: 337,398

[22] Filed: Apr. 13, 1989

[51] Int. Cl.$^4$ .............................................. B32B 27/00
[52] U.S. Cl. ..................... 428/286; 428/171; 428/195; 428/284; 428/297; 428/492; 428/903; 428/913
[58] Field of Search ............... 428/284, 286, 297, 171, 428/172, 195, 492, 903, 913

[56] References Cited

U.S. PATENT DOCUMENTS

| | | | |
|---|---|---|---|
| Re. 31,885 | 5/1985 | Meitner | 252/91 |
| 1,486,660 | 3/1924 | Hajdu | |
| 2,020,255 | 11/1935 | Copeman | 154/2 |
| 2,020,256 | 11/1935 | Copeman | 91/63 |
| 2,119,072 | 5/1938 | Cohen | 280/150 |
| 2,460,394 | 2/1949 | Peatross | 280/150 |
| 2,880,015 | 3/1959 | Harben | 280/150 |
| 3,477,084 | 11/1969 | Thomas | 15/104.93 |
| 3,490,583 | 1/1970 | Cook | 206/65 |
| 3,520,016 | 7/1970 | Meitner | 15/209 |
| 3,546,056 | 12/1970 | Thomas | 161/57 |
| 3,814,101 | 6/1974 | Kozak | 128/287 |
| 3,924,212 | 12/1975 | Brown | 335/303 |
| 3,928,712 | 1/1967 | Greenstadt | 280/150 |
| 4,094,014 | 6/1978 | Schroeder | 2/161 |
| 4,103,058 | 7/1978 | Humlicek | 428/171 |
| 4,187,337 | 2/1980 | Romageon | 428/95 |
| 4,196,245 | 4/1980 | Kitson et al. | 428/903 |
| 4,298,649 | 11/1981 | Meitner | 428/198 |
| 4,359,503 | 11/1982 | Terret et al. | 428/903 |
| 4,379,192 | 4/1983 | Wahlquist et al. | 428/171 |
| 4,587,154 | 5/1986 | Hotchkiss et al. | 428/903 |
| 4,781,962 | 11/1988 | Zamarripa et al. | 428/903 |

FOREIGN PATENT DOCUMENTS 0088533  9/1983  European Pat. Off. .

OTHER PUBLICATIONS

Article from Plastics Engineering, Feb. 1987.
Superfine Thermoplastic Fibers, V. Wente, Industrial and Engineering Chemistry (Aug. 1956).
Manufacture of Superfine Organic Fibers, V. Wente et al., Report No. 4364 of the Naval Research Laboratories (May 25, 1954).
Shell Chemical Company Technical Bulletin SC:607-82.

Primary Examiner—James J. Bell
Attorney, Agent, or Firm—Donald M. Sell; Walter N. Kirn; Stephen W. Bauer

[57] ABSTRACT

A flexible fender cover adapted for covering a fender of an automobile or the like while a mechanic works on the automobile. The cover comprises an absorbent layer of a generally oleophilic melt blown microfiber material, and a non-slip layer on one major surface of the absorbent layer. The absorbent layer is bonded at spaced locations to prevent separation or linting of the fibers forming the layer. The non-slip layer is formed of generally non-slip and non-abrasive elastomeric material having a generally high coefficient of friction in a shear mode relative to the fender to grip the fender, with generally low adhesion when peeled or lifted from the fender.

15 Claims, 1 Drawing Sheet

FENDER COVER

The invention relates generally to fender covers, and more particularly to a non-slip, absorbent cover adapted for use covering and protecting the fender of an automobile or the like while a mechanic works on the automobile.

BACKGROUND OF THE INVENTION

Various types of fender covers have been used to protect fragile painted surface of automobile and truck fenders or the like, and to absorb spilled fluids, such as oil or grease. Automobile mechanics have typically placed conventional cloth rags on a front fender before working on the engine. These rags frequently slip from the fender to the floor, leaving the surface of the fender unprotected and picking up dirt and dust from the floor. When the mechanic picks the rag off the floor to place it back on the fender, the dirt and dust now carried by the rag may scratch the finish of the fender. In addition, such conventional rags typically are able to absorb only a small amount of spilled oil or grease, thus allowing unabsorbed grease and oil to coat and damage the painted finish.

U.S. Pat. No. 3,924,212 describes a vinyl cloth-backed fabric with flexible magnetic strips to hold the cloth on an automobile fender and to secure tools on the cloth, and U.S. Pat. No. 3,298,712 discloses a fender pad having foam rubber and vinyl layers, and a pocket for holding tools stitched to the vinyl layer. The Sealed Air Corp. of Fair Lawn, N.J. reportedly offers an adhesive-coated, bubble-cushioned masking for sale under the trade designation "Bubble Mask" for various uses including protecting painted automotive finishes during assembly (Plastics Engineering (Society of Plastics Engineers, Inc., Brookfield Center, Conn., February 1987) at page 49).

While these covers may be more able to remain in position on the fender than a conventional cloth cover, they are not designed to absorb spilled oil or grease. Undesirable results may include unabsorbed, spilled oil flowing along the surface of the cover, and possibly coating and damaging a painted surface of the fender adjacent an edge of the cover or spilling on the floor, where the mechanic is likely to walk through the oil and track it over the floor. Spilled grease or high viscosity oil may remain on the surface of the cover, where the mechanic or the mechanic's clothes are likely to come in contact with the oil or grease. In addition, an adhesive-coated cover may pick up undesirable dirt or dust when used in an automotive garage, which may then scratch the finish of the paint.

An additional problem with using these covers on automobiles being repaired in automotive garages and the like is that they are designed to be reuseable, and with the possible exception of the conventional cloth covers, they may be too expensive to be disposed after a single use. However, it is believed that disposable or semi-disposable covers would be particularly desirable for use in automotive garages, because the non-abrasiveness and cleanliness of the cover could be more effectively ensured if new covers are frequently used.

SUMMARY OF THE INVENTION

The invention provides a fender cover that is adapted for covering a fender of an automobile or the like while a mechanic works on the automobile; that is designed to remain on the fender without slipping; that is non-abrasive and resistant to picking up abrasive dust and dirt particles on the surface intended to be laid against the fender; that may be inexpensively manufactured so that it may be disposed of after use; and that is designed to be able to absorb relatively large quantities of oil or grease (e.g., eight grams light mineral oil per one gram of the cover's absorbent material).

Generally, a fender cover of the invention comprises an absorbent layer of a generally oleophilic blown microfiber material. The absorbent layer is bonded at spaced locations to prevent separation or linting thereof. A non-slip layer is provided on one major surface of the absorbent layer. The non-slip layer is formed of generally non-slip and non-abrasive elastomeric material having a generally high coefficient of friction in a shear mode relative to the fender to grip the fender, with generally low adhesion when peeled or lifted from the fender.

Other features will be in part apparent and in part pointed out hereinafter.

BRIEF DESCRIPTION OF THE DRAWING

The invention will be further described with reference to the drawing wherein corresponding reference characters indicate corresponding parts throughout the several views of the drawing, and wherein.

DETAILED DESCRIPTION

Figure 1:
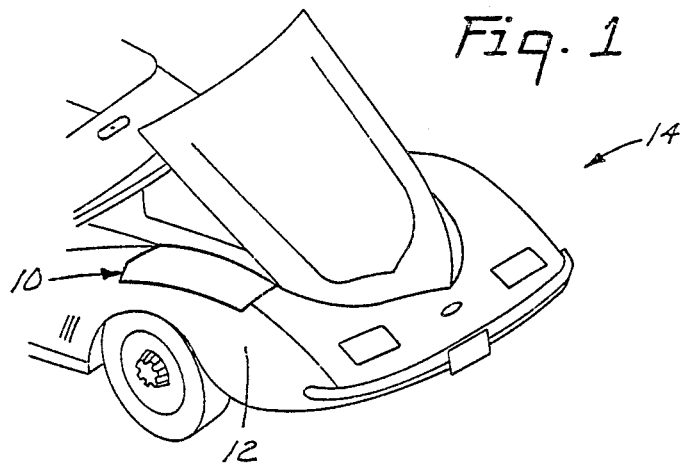
FIG. 1 a perspective view of a fender cover of the invention positioned on an automobile fender for protection of the fender while a mechanic works on the automobile.

Now referring to the drawing, a disposable fender cover of the invention is designated in its entirety by the reference numeral 10. As shown in FIG. 1, the fender cover 10 is adapted for covering a fender 12 of an automobile 14, truck or the like while a mechanic works on the automobile to protect the painted surface of the fender 12 from nicks, chips or scratches, and to absorb spilled oil or grease.

Figure 2:
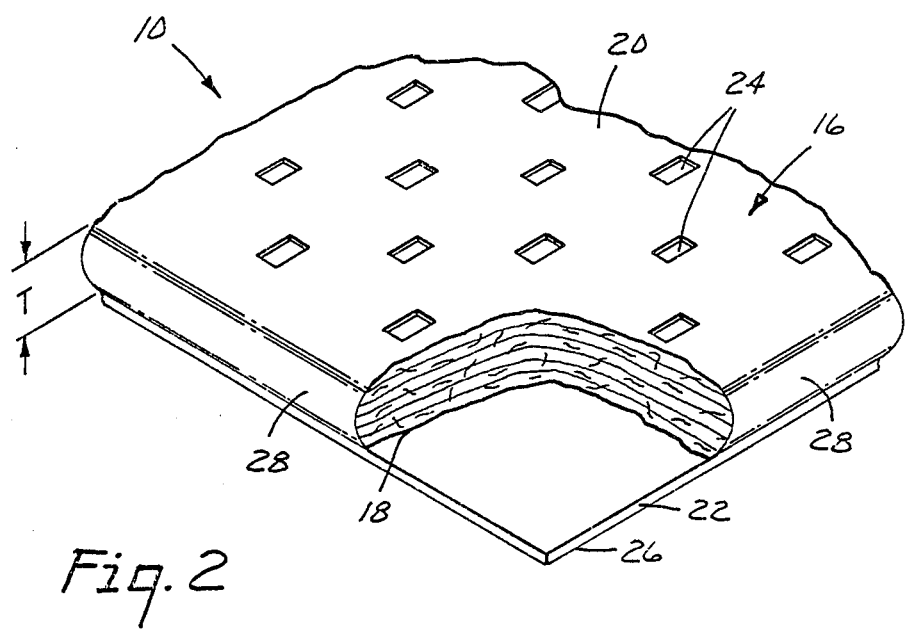
FIG. 2 is an enlarged perspective view of the fender cover of FIG. 1, with a portion broken away to illustrate details.

As shown in FIG. 2, the fender cover 10 generally comprises an absorbent layer 16 of a generally oleophilic blown microfiber material having opposite major side surfaces 18 and 20, and a non-slip layer 22 on/along major surface 18. The absorbent layer 16 is bonded at spaced locations 24 to prevent separation or linting of the fiber forming the layer 16, and preferably has a thickness T between the major surfaces 18 and 20 of approximately 1-20 mm. As used herein, "absorbent" means sorbent, including both the absorbent and adsorbent mechanisms for adsorbing fluid, and is not intended to suggest whether the material is specifically capable of absorbing oil or water based fluids, unless the words oleophilic and/or hydrophilic are used.

The absorbent layer 16 is formed of oleophilic polymeric material, such as various suitable polyolefinic materials (e.g., polypropylene, polybutylene, polyethylene, polyurethane, etc., and blends thereof). The absorbent layer 16 may be formed of the melt blown microfiber web material ("BMF" material), the manufacture of which is described in V. Wente, "Superfine Thermoplastic Fibers", Vol. 48, Industrial and Engineering Chemistry (August 1956), pp. 1342-1346 (incorporated herein by reference), and in V. Wente et al., "Manufacture of Superfine Organic Fibers", Report No. 4364 of the Naval Research Laboratories (May 25, 1954) (incorporated herein by reference).

Suitable absorbent materials are sold under the trade designations "Oilsorb" or "Powersorb" by the Minnesota Mining and Manufacturing Company of St. Paul, Minn. "Powersorb" brand BMF material is treated with a non-ionic surfactant to render the material both oleophilic and hydrophilic so that an absorbent layer 16 formed of "Powersorb" material is able to absorb both oil and water based fluids, such as motor oil, windshield washer fluid, or anti-freeze radiator fluid. "Oilsorb" brand BMF material, which is oleophilic and hydrophobic, may be preferred for use in especially damp environments, for example, where it may be desirable to absorb oil without absorbing water.

The melt blown microfiber web 16 may be formed with approximately ten percent solidity, i.e., with the overall web density being approximately ten percent of the solid density of the polymeric material forming the web, so that sufficient void volume is available to absorb approximately eight grams of a light test mineral oil per gram of unbonded absorbent material. For example, the polypropylene web 16 is believed to be capable of absorbing approximately ten grams of light mineral oil per each gram of unbonded web material. And the average mass density of the polypropylene web 16 may be, for example, between approximately 0.01 and 0.06 grams per cubic centimeter, preferably about 0.04 grams per cubic centimeter.

The absorbent layer 16 is preferably designed to have sufficient maximum energy dissipation or impact resistance to absorb the impact of a wrench or other tool inadvertently dropped on the cover 10 without chipping the paint or bending the fender. For example, it is believed that sufficient energy dissipation will be provided if the absorbent layer 16 has a mass of at least 100 g per square meter of surface area, but preferably at least 200 g/m$^2$.

Preferably, the absorbent layer 16 is bonded (at 24) from the major surface 20 opposite the non-slip layer 22 in order to maintain a generally smooth non-slip surface 26 along the non-slip layer 22, while producing bonded indentations 24 in the absorbent layer 16 from the opposite major surface 20 to prevent linting or separation of the web material 16. For example, the absorbent layer 16 may be point bonded or calendar by continuously running laminated cover material between a calendering roller and a smooth roller (not shown), with the non-slip layer 22 in rolling engagement with the smooth roller and the opposite major surface 20 of the absorbent layer in rolling engagement with the calendering roller. The calendering roller may be designed to point bond at least approximately ten percent of the total surface area of of the major surface 20, although fifteen percent is preferred. The edges 28 of the absorbent layer 16 may also be bonded to prevent separation of the web material.

The non-slip layer 22 is formed of a generally non-slip and non-abrasive elastomeric or rubbery material having a generally high coefficient of friction in a shear mode relative to the fender 12 to grip the fender (i.e., a high tendency to resist opposite parallel sliding motion of the non-slip layer 22 relative to the fender), with generally low adhesion when peeled (e.g., lifted at approximately 90 degrees from the surface) or lifted from the fender 12. As used herein, "rubbery" refers to the elasticity and flexibility generally associated with rubber, but is not intended to be limited to natural or synthetic rubber.

The non-slip layer 22 is preferably formed of "rubbery" polymeric material having a relatively low modulus of elasticity, e.g., no more than approximately 5,000 lbs./in.$^2$ (34.5 MPa) as measured according to the ASTM Standard Test Methods D638-86 and D638M-84, published by the American Society for Testing and Materials of Philadelphia, Pa. (incorporated herein by reference). Rubbery or elastomeric materials having such a low modulus of elasticity are believed to develop a high coefficient of friction in a shear mode relative to painted or metal surfaces, without adhesion or with at most low adhesion to the surface, and without attracting dust and dirt as is the case with adhesive-coated surfaces.

More specifically, the material of the non-slip layer 22 may include an elastomeric thermoplastic resin, such as the styrene tri-block copolymer with polystyrene end blocks and a poly(ethylene-butylene) midblock sold under the trademark "Kraton GX 1657" by the Shell Chemical Company of Houston, Texas. "Kraton GX 1657" is believed to have a desirably low modulus of elasticity of approximately 350 psi (2.4 MPa) at 300 percent extension, and a particularly high coefficient of friction in a shear mode to grip the fender 12. In order to improve the adhesion of the "Kraton GX 1657" material to the BMF material of the absorbent layer 16, a low molecular weight ethylene/vinyl acetate copolymer ("EVA") such as sold under the trade designation "Elvax 420" by Du Pont de Nemours & Company, E. I. of Wilmington, Del., is preferably blended in an approximately 50—50 blend with the "Kraton GX 1657" polymer. Other non-slip materials are also contemplated, such as various types of natural or synthetic rubbers having sufficiently high coefficients of friction with respect to painted surfaces and desirably low module of elasticity.

Covers 10 are preferably manufactured by blowing molten thermoplastic resins along major surface 18 of a pre-formed absorbent layer 16 to from the non-slip layer or coating 22. The covers 10 may also be manufactured by co-extruding the absorbent BMF web layer 16 and the blended polymeric non-slip layer 22, or alternatively, by spraying or brushing the non-slip blended thermoplastic material along major surface 18 of a pre-formed absorbent layer 16.

As various changes could be made in the above constructions and methods without departing from the scope of the invention, it is intended that all matter contained in the above description or shown in the accompanying drawing shall be interpreted as illustrative and not in a limiting sense.

I claim:

1. A flexible fender cover adapted for covering a fender of an automobile or the like while a mechanic works on the automobile, the cover comprising:
    an absorbent layer of a generally oleophilic blown microfiber material and having opposite major side surfaces, the absorbent layer being bonded at spaced locations to prevent separation or linting thereof; and
    a non-slip layer on one major surface of the absorbent layer formed of generally non-slip and non-abrasive elastomeric material having a generally high coefficient of friction in a shear mode relative to the fender to grip the fender, with generally low adhesion when peeled or lifted from the fender.

2. A cover according to claim 1 wherein the absorbent layer is bonded from the major surface opposite the non-slip layer such that the non-slip layer is generally smooth.

3. A cover according to claim 2 wherein the absorbent layer has a bonded surface area of greater than approximately ten percent of the total surface area of the major surface.

4. A cover according to claim 1 wherein the absorbent layer is formed of polymeric melt blown microfiber web material having a web density of approximately ten percent of the density of the polymeric material forming the web.

5. A cover according to claim 4 wherein the absorbent layer has a thickness between the major surfaces of approximately 1-20 mm, and sufficient void volume available to absorb approximately eight grams of light mineral oil per gram of unbonded web material of the absorbent layer.

6. A cover according to claim 5 wherein the the polymeric melt blown microfiber material is formed of polypropylene.

7. A cover according to claim 1 wherein the non-slip layer is formed of polymeric material having a modulus of elasticity of no more than approximately 34.5 MPa.

8. A cover according to claim 7 wherein the polymeric material of the non-slip layer comprises an elastomeric thermoplastic resin.

9. A cover according to claim 8 wherein the elastomeric thermoplastic resin comprises a styrene tri-block copolymer with polystyrene end blocks and a poly-(ethylene-butylene) midblock, the polymeric material of the non-slip layer further including an ethylene/vinyl acetate copolymer in an approximately 50—50 blend with the elastomeric thermoplastic resin.

10. A flexible fender cover adapted for covering a fender of an automobile or the like while a mechanic works on the automobile, the cover consisting essentially of:

an absorbent layer formed of a generally oleophilic melt-blown-microfiber polypropylene material having opposite major side surfaces, the absorbent layer being bonded at spaced locations to prevent separation or linting thereof; and a non-slip layer on one major surface of the absorbent layer formed of generally non-slip and non-abrasive elastomeric material having a generally high coefficient of friction in a shear mode relative to the fender to grip the fender, with generally low adhesion when peeled or lifted from the fender.

11. A cover according to claim 10 wherein the absorbent layer is bonded from the major surface opposite the non-slip layer such that the non-slip layer is generally smooth, and the absorbent layer has a bonded surface area of greater than approximately ten percent of the total surface area of the major surface.

12. A cover according to claim 10 wherein the absorbent layer is formed of polypropylene melt blown microfiber web material having a web density of approximately ten percent of the density of polypropylene, and sufficient void volume available to absorb approximately eight grams of light mineral oil per gram of web material of the absorbent layer.

13. A cover according to claim 10 wherein the non-slip layer is formed of polymeric material having a modulus of elasticity of no more than approximately 34.5 MPa.

14. A cover according to claim 13 wherein the polymeric material of the non-slip layer comprises an elastomeric thermoplastic resin.

15. A cover according to claim 14 wherein the elastomeric thermoplastic resin comprises a styrene tri-block copolymer with polystyrene end blocks and a poly-(ethylene-butylene) midblock, the polymeric material of the non-slip layer further including a low molecular weight ethylene/vinyl acetate copolymer in an approximately 50—50 blend with the elastomeric thermoplastic resin.

* * * * *

UNITED STATES PATENT AND TRADEMARK OFFICE
CERTIFICATE OF CORRECTION

PATENT NO. : 4,895,753

DATED : January 23, 1990

INVENTOR(S) : Thomas J. Etter

It is certified that error appears in the above-identified patent and that said Letters Patent is hereby corrected as shown below:

Col. 2, line 55, "adsorbing" should read --sorbing--.

Col. 3, line 47, "calendar" should read --calendered--.

Col. 4, line 37, "module" should read --moduli--.

Signed and Sealed this

Thirtieth Day of April, 1991

Attest:

HARRY F. MANBECK, JR.

Attesting Officer

Commissioner of Patents and Trademarks